Figure 1:
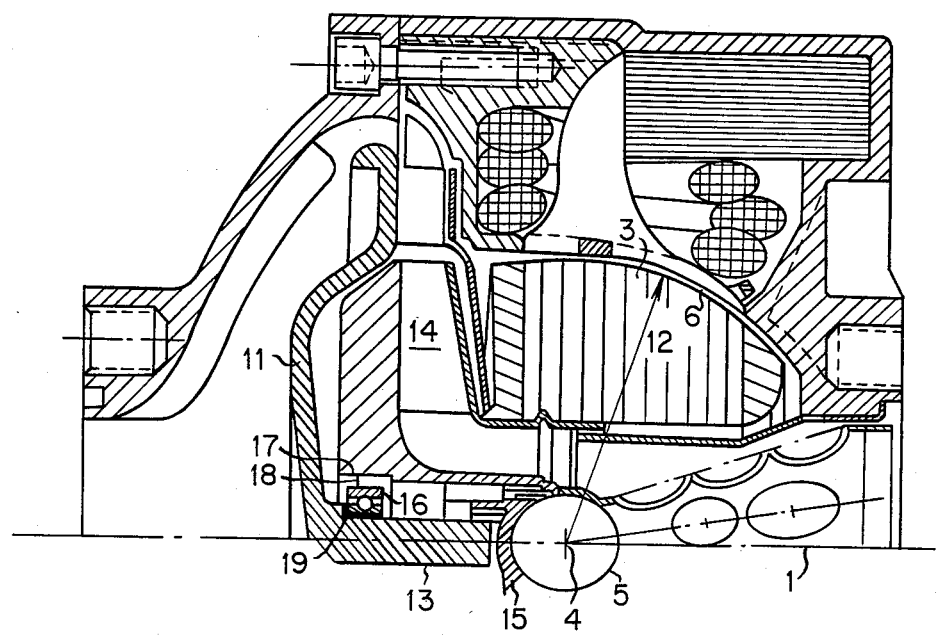

United States Patent [19]

Laing

[11] Patent Number: 4,599,530
[45] Date of Patent: Jul. 8, 1986

[54] ROTOR SUPPORTED TO BE ABLE TO WOBBLE

[76] Inventor: Karsten Laing, 632 Marsat Ct., Chula Vista, Calif. 92011

[21] Appl. No.: 667,697

[22] Filed: Nov. 2, 1984

[51] Int. Cl.⁴ ............................................. H02K 5/16
[52] U.S. Cl. ...................................... 310/90; 310/51; 310/166; 384/126
[58] Field of Search ................... 310/166, 91, 86, 87, 310/254, 217, 218, 104, 52, 54, 90, 51, 62, 63; 417/420; 384/126

[56] References Cited

U.S. PATENT DOCUMENTS

| | | | |
|---|---|---|---|
| 3,438,328 | 4/1969 | Laing | 310/104 |
| 3,483,407 | 12/1969 | Frohmuller | 310/51 |
| 3,546,504 | 12/1970 | Janssen | 310/51 |
| 3,568,962 | 3/1971 | Janssen | 310/51 |
| 3,723,029 | 3/1973 | Laing | 310/104 |
| 3,741,690 | 6/1973 | Laing | 310/166 |
| 4,051,401 | 9/1977 | Hayward | 310/254 |

Primary Examiner—R. Skudy
Attorney, Agent, or Firm—Pennie & Edmonds

[57] ABSTRACT

A magnetic machine of spherical-gap type includes a bearing arrangement of a rotating member having convex and concave elements. An other radially disposed bearing is concentrically arranged with the abovementioned bearing arrangement to form a gap which limits the angle of wobble of the rotating member and preventing the angle from increasing once the rotating member contacts the radially disposed member.

7 Claims, 2 Drawing Figures

ROTOR SUPPORTED TO BE ABLE TO WOBBLE

The invention refers to a rotor supported to be able to wobble, of an electrical machine or a magnetic coupling having a gap for the magnetic flux running spherically, in particular for driving a centrifugal pump the impeller of which forms with the rotor one unit.

Electric motors which form one unit with the impeller of a centrifugal machine and have a spherical airgap between the member generating a rotating field and the rotor, that is, spherical motors or else spherical magnetic couplings (called below "magnetic machines") are increasingly gaining in economic importance. The disadvantage of this kind of machine which is shaftless and also otherwise endowed with many advantages, is based upon the fact that the motors demand a mounting fixed in space, since any sort of twisting of the motor axis is attended with gyroscopic precessional motions of the rotor. Also when other disturbing forces arise, e.g., those which are caused by asymmetrical radial loading of the impeller, the rotor-impeller unit may be set in wobbling oscillations which may lead to the rotating parts touching parts fixed to the casing and lead to destruction.

The invention eliminates these disadvantages by a radial bearing being provided, which is arranged at an axial distance away from the centre of the ball of the spherical bearing, and which is supported on a spindle fixed to the casing. The same effect is achieved if a stub shaft carried by the impeller unit is supported against a bore in the casing via a radial bearing, preferably a roller bearing. The invention provides that the gaps at the outer or inner periphery of the radial bearing are chosen to be so large that in the case of a wobbling motion of a permissible angle of wobble no contact is caused between the radial bearing and the motor member, so that the radial bearing only comes into action upon the permissible angular amount being exceeded. As the material for the radial bearing the invention provides preferably for non-metallic materials, e.g., bearing bushes of polytetrafluroroethllene abreviated as PTFE or else ball bearings having balls of glass and races of a thermoplastic material.

The invention is to be explained with the aid of Figures:

FIG. 1 shows a motor-pump unit having a rotating member such as a rotor-impeller unit (3, 14) rotating about the axis (1), which is supported by means of a bearing comprised of a cap or concave sliding partner (15) with respect to the stationary ball or convex sliding partner (5) having the centre (4) which is concentric with the spherical airgap having the radius (12). For limiting the angle of wobble there is arranged on the stub spindle (13) which forms one unit with the stationary distributor (11), a radial bearing such as a rolling bearing or a ball or rolling bearing (16) has an inner and outer ring (not identified) which forms a gap (18) with the inner diameter (17) of the impeller (14). As soon as the impeller (14) experiences a wobbling acceleration which would lead to an impermissibly large amplitude of the angle of wobble, the amplitude of wobble is limited by the ball or rolling bearing (16) so that contact of the rotating parts with adjacent stationary parts is excluded. As is seen in FIG. 1, wobble occurs about the convex sliding partner (5). The upper part of the impeller (14) would contact bearing (16) which limits the wobble of the impeller.

Damping of the wobbling acceleration is also achieved by the ball bearing (16) consisting of a thermoplastic material. Additional damping may be achieved by an oscillation-absorbing material such as sleeve (19) having the elasticity of rubber being arranged between the stub spindle (13) and the inner ring of the ball bearing (16).

Figure 2:
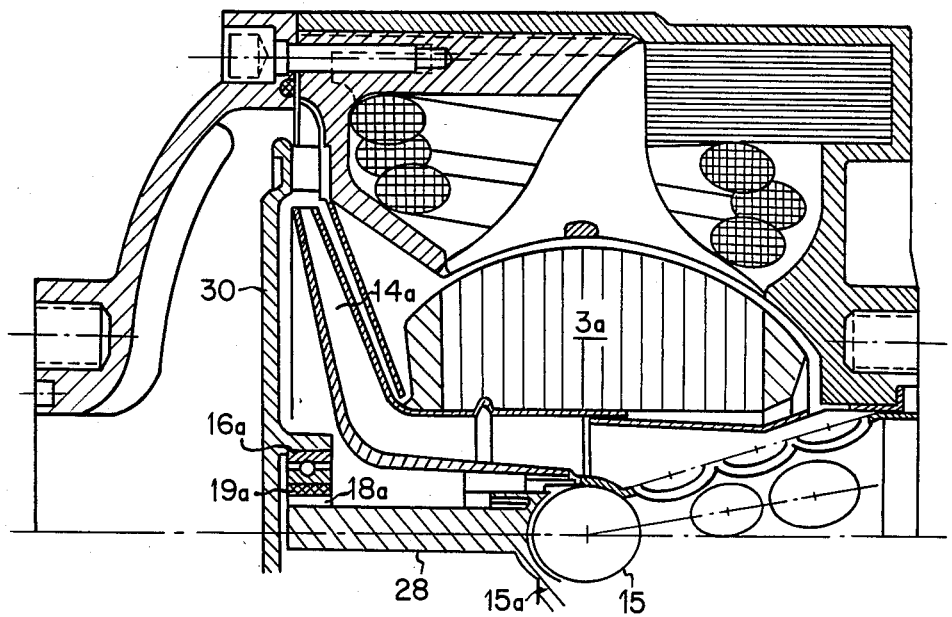

FIG. 2 shows an alternative arrangement in which a stub shaft (28) forms one unit with the bearing cap (15a). In the stationary part (30) of the pump a ball bearing (16a) is arranged, in which a sleeve having the elasticity of rubber (19a) is inserted, the inner diameter of which forms with the stub shaft (28) a gap (18a). The rotating member is made similarly to that of FIG. 1 of impeller (14a) and rotor (3a).

I claim:

1. A magnetic machine having a spherical gap for the magnetic flux between a stationary and a rotating member of the machine, where the rotating member of the machine exhibits a bearing formed from a convex sliding partner and a concave sliding partner, which allows wobbling motions, characterized in that besides the bearing consisting of the convex sliding partner (5) and the concave sliding partner (15) there is provided, arranged remote from it by an axial amount, a radial bearing 16, 16a which forms with said member (13, 28) of the machine which is arranged concentrically with respect to the bearing (5, 15), a gap (18, 18a) which limits the angle of wobble of the rotating member of the machine by preventing the angle from increasing once the rotating member contacts the radial bearing.

2. A magnetic machine as in claim 1, characterized in that the radial bearing (16) is fastened to a stub spindle (13) which forms one unit with a structural member (11) fixed to the casing, the radial bearing (16) projecting into the rotating member (14) of the machine.

3. A magnetic machine as in claim 1, characterized in that the radial bearing (16a) is pressed onto a bearing seating which is formed by a stationary member (30) of the machine and forms a gap (18a) with a stub shaft (28) which forms one unit with the rotating member (3a, 14a) of the machine.

4. A magnetic machine as in claim 1, characterized in that the radial bearing is made as a rolling bearing.

5. A magnetic machine as in claim 4, characterized in that between the rolling bearing (16) and the stub spindle (13) carrying it an oscillation-absorbing sleeve (19) is arranged.

6. A magnetic machine as in claim 4, characterized in that between the rolling bearing (16a) and the stub shaft (28) forming a gap with it an element (19a) of oscillation-damping material is arranged.

7. An electrical machine as in claim 4, characterized in that the rolling bearing has an outer ring and an inner ring, and at least one of said outer ring and the said inner ring of the rolling bearing (16, 16a) consist of thermoplastic plastics.

* * * * *